US012612538B2

(12) United States Patent
    Pennekamp

(10) Patent No.: US 12,612,538 B2
(45) Date of Patent: Apr. 28, 2026

(54) CONDUCTIVE DOUBLE-SIDED PRESSURE-SENSITIVE ADHESIVE STRIP

(71) Applicant: tesa SE, Norderstedt (DE)

(72) Inventor: Jan-Gerd Pennekamp, Hamburg (DE)

(73) Assignee: tesa SE, Norderstedt (DE)

( * ) Notice: Subject to any disclaimer, the term of this patent is extended or adjusted under 35 U.S.C. 154(b) by 595 days.

(21) Appl. No.: 18/002,815

(22) PCT Filed: Jun. 1, 2021

(86) PCT No.: PCT/EP2021/064637
    § 371 (c)(1),
    (2) Date: Dec. 21, 2022

(87) PCT Pub. No.: WO2021/259599
    PCT Pub. Date: Dec. 30, 2021

(65) Prior Publication Data
    US 2023/0242794 A1      Aug. 3, 2023

(30) Foreign Application Priority Data

Jun. 23, 2020    (DE) ..................... 10 2020 207 783.5

(51) Int. Cl.
    *C09J 7/38*        (2018.01)
    *B32B 3/04*        (2006.01)
    (Continued)

(52) U.S. Cl.
    CPC ................. *C09J 7/387* (2018.01); *B32B 3/04* (2013.01); *B32B 5/18* (2013.01); *B32B 7/12* (2013.01); *B32B 15/20* (2013.01); *C09J 7/26* (2018.01); *C09J 7/38* (2018.01); *C09J 7/383*

(2018.01); *C09J 7/385* (2018.01); *C09J 153/02* (2013.01); *H01B 5/00* (2013.01);
(Continued)

(58) Field of Classification Search
    None
    See application file for complete search history.

(56) References Cited

U.S. PATENT DOCUMENTS 4,460,804 A    7/1984  Svejkovsky
5,087,494 A    2/1992  Calhoun et al.
            (Continued)

FOREIGN PATENT DOCUMENTS

CN      102786883 A    11/2012
DE      19642178 A1     4/1998
            (Continued)

OTHER PUBLICATIONS

Data Sheet No. 5603 adhesive (Year: 2019).*
            (Continued)

*Primary Examiner* — Frank D Ducheneaux
(74) *Attorney, Agent, or Firm* — Price Heneveld LLP

(57)        ABSTRACT

A double-sided pressure-sensitive adhesive strip is provided that includes a pressure-sensitive adhesive strip comprising two opposing strip surfaces configured for bonding. At least one conductive component connects the two opposing strip surfaces configured for bonding in the z-direction. Also provided is a component and/or a composite, which is bonded with the conductive pressure-sensitive adhesive strip. Further, uses are provided of the conductive pressure-sensitive adhesive strip.

18 Claims, 1 Drawing Sheet

(51) Int. Cl.

| | |
|---|---|
| *B32B 5/18* | (2006.01) |
| *B32B 7/12* | (2006.01) |
| *B32B 15/20* | (2006.01) |
| *C09J 7/26* | (2018.01) |
| *C09J 153/02* | (2006.01) |
| *H01B 5/00* | (2006.01) |

(52) U.S. Cl.

CPC ... *B32B 2266/0242* (2013.01); *B32B 2266/14* (2016.11); *B32B 2405/00* (2013.01); *C09J 2301/302* (2020.08); *C09J 2301/314* (2020.08); *C09J 2301/408* (2020.08); *C09J 2301/412* (2020.08); *C09J 2400/243* (2013.01); *C09J 2433/00* (2013.01); *C09J 2453/00* (2013.01)

(56) References Cited

U.S. PATENT DOCUMENTS

| | | | |
|---|---|---|---|
| 5,275,856 | A | 1/1994 | Calhoun et al. |
| 11,910,159 | B2 * | 2/2024 | Miyoshi ............... H10N 30/875 |
| 2003/0138624 | A1 * | 7/2003 | Burmeister ............... C08L 7/00 |
| | | | 428/354 |
| 2012/0291837 | A1 | 11/2012 | Lin et al. |
| 2018/0086954 | A1 | 3/2018 | Morioka et al. |

FOREIGN PATENT DOCUMENTS

| | | | |
|---|---|---|---|
| DE | 10034112 | A1 | 5/2003 |
| DE | 102008004388 | A1 | 7/2009 |
| DE | 102008047964 | A1 | 3/2010 |
| DE | 102008052625 | A1 | 4/2010 |
| DE | 102008056980 | A1 | 5/2010 |
| DE | 102008059050 | A1 | 5/2010 |
| DE | 102009036968 | A1 | 2/2011 |
| DE | 102009036970 | A1 | 2/2011 |
| DE | 102011085034 | A1 | 4/2013 |
| DE | 102012202377 | A1 | 4/2013 |
| DE | 102012212883 | A1 | 5/2014 |
| DE | 102013215296 | A1 | 2/2015 |
| DE | 102013215297 | A1 | 2/2015 |
| DE | 102015206076 | A1 | 10/2016 |
| DE | 102015212058 | A1 | 12/2016 |
| DE | 102016209707 | A1 | 12/2017 |
| DE | 102017206083 | A1 | 10/2018 |
| DE | 102017218519 | A1 | 4/2019 |
| EP | 1020505 | A2 | 7/2000 |
| EP | 2524952 | A1 | 11/2012 |
| EP | 3333236 | A1 | 6/2018 |
| JP | 2004186026 | A | 7/2004 |
| JP | 2012243761 | A | 12/2012 |
| KR | 100966658 | B1 | 6/2010 |
| KR | 20190108484 | A * | 9/2019 | ........ H01L 21/6836 |
| WO | 2014136606 | A1 | 9/2014 |
| WO | 2018229609 | A1 | 12/2018 |
| WO | WO-2020095812 | A1 * | 5/2020 | ............... H04R 1/06 |

OTHER PUBLICATIONS

Machine translation of JP 2004186026 A (Year: 2004).*

Machine translation of KR_20190108484_A (Year: 2019).*

Human-assisted machine translation of JP_2004186026_A (Year: 2004).*

Habenicht, Gerd, "Adhere—Basics, Technologies, Applications," 2009, 6th edition, pp. 191-201, Springer, Heidelberg, Germany, 45 pages.

Donatas Satas, Handbook of Pressure Sensitive Adhesive Technology, 1999, 609-631, 3rd. Ed., Satas & Associates, Warwick, Rhode Island, U.S.A., 70 pages.

Korean Intellectual Property Office, Request for the Submission of an Opinion for Korean Patent Application No. 10-2022-7041934, dated Mar. 20, 2024, 11 pages.

* cited by examiner

CONDUCTIVE DOUBLE-SIDED PRESSURE-SENSITIVE ADHESIVE STRIP

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/EP2021/064637, filed on Jun. 1, 2021, designating the United States of America, which in turn claims the benefit of priority under 35 U.S.C. §§ 119, 365 of German Patent Application No. 102020207783.5, filed Jun. 23, 2020, the contents of which are relied upon and incorporated herein by reference in their entirety.

FIELD OF THE DISCLOSURE AND BACKGROUND

In the existing market there are adhesive films which are rendered conductive, usually by means of additives, in order to ensure grounding to earth. These films are typically intended for the prevention of static charging and for shielding with respect to electromagnetic interference. The intended objective of power and data transport is therefore not possible.

U.S. Pat. Nos. 5,087,494 A and 4,460,804 A, moreover, describe a metal conductor embedded into the single-sided adhesive tape. Electricity is conductive exclusively along the length of the adhesive tape with no capacity for connecting electrically conducting contacts in the z-direction. Accordingly, the possibility for supplying power to components mounted by bonding is only very limited or is zero.

WO 2018/229609 A1 describes a stretchable conductor which comprises a substrate having a first main surface, the substrate comprising an elastomer material, and an elongate wire on the first main face of the substrate. The wire comprises a first end and a second end and also at least one arc-shaped region between the first end and the second end.

Pressure-sensitive adhesives (PSAs) and their production, from solution or from the melt, for example, are described, moreover, in—for example—the Gerd Habenicht text book "Kleben: Grundlagen, Technologien, Anwendungen" [Adhesive Bonding: Principles, Technologies, Applications], 6th edition, 2009, chapter 3.4, and in Donatas Satas: "Handbook of Pressure Sensitive Adhesive Technology", 3rd edition, 1999.

In times in which the term "smart" is being used no longer only in high-tech product groups but also, more and more, is entering the realm of everyday products, it is appropriate to provide the components involved, as well, with corresponding electrification, in order to extend the field of application of adhesive films. The common methods in the automotive industry for supplying a variety of components with power are usually soldering, plugging or clipping of power and data leads. Common to these methods is that they require an additional and frequently manual operating step in order to ensure the flow of power and data. The components, moreover, must be secured by adhesive bonding, plugging or bolting.

SUMMARY OF THE DISCLOSURE

The present invention relates to a double-sided, meaning double-sided adhesive, pressure-sensitive adhesive strip which is conductive in the z-direction, i.e., substantially perpendicularly to the eventual bonding face. The invention also relates to a component and an assembly bonded using the conductive pressure-sensitive adhesive strip, and also to the use of the conductive pressure-sensitive adhesive strip.

According to a first embodiment of the present disclosure, a double-sided pressure-sensitive adhesive strip includes a pressure-sensitive adhesive strip comprising two opposing strip surfaces configured for bonding. At least one conductive component connects the two opposing strip surfaces configured for bonding in the z-direction.

According to an aspect of the present disclosure, a component includes power leads and/or contacts. The power leads and/or contacts bear a pressure-sensitive adhesive strip. The strip includes two opposing strip surfaces configured for bonding. At least one conductive component connects the two opposing strip surfaces configured for bonding in the z-direction. Further, the power leads and/or contacts are in contact with the at least one conductive component of the strip.

According to another aspect of the present disclosure, an assembly includes a first component having contacts and/or power leads, and a second component having contacts and/or power leads. The first and second components are bonded by means of a pressure-sensitive adhesive strip. The pressure-sensitive adhesive strip includes two opposing strip surfaces configured for bonding. At least one conductive component connects the two opposing strip surfaces configured for bonding in the z-direction. The contacts and/or power leads of the first component and the second component are in contact with the at least one conductive component of the strip. Further, the second component is a consumer product.

BRIEF DESCRIPTION OF THE DRAWINGS

On the basis of the figures described below, particularly advantageous embodiments of the invention are elucidated in more detail, without any intention therewith of unnecessary limitation of the invention.

FIG. 3 shows the cross section of an assembly composed of:

Figure 1:
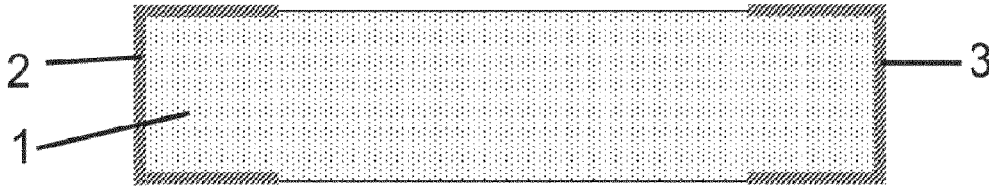
FIG. 1 shows the cross section of a double-sided pressure-sensitive adhesive strip (1) of the invention having two conductive components (2, 3), such as flat cables, for example, which are wrapped around the edges of the strip (1), and specifically on opposite sides of the strip (1).

(i) a pressure-sensitive adhesive strip (1) of the invention having two conductive components (2,3) wrapped around the edges of the strip, as described in FIG. 1, this strip being bonded between (ii) a component (6) having contacts and/or power leads (4,5) which are in contact with the two conductive components (2,3) of the strip (1), i.e., a component bearing a bond, and (iii) a consumer product (7) having contacts and/or power leads (8,9) which are in contact with the two conductive components (2, 3) of the strip (1), i.e., a component for bonding.

DETAILED DESCRIPTION OF THE PREFERRED EMBODIMENTS

The stated disadvantages of the prior art are resolved by a double-sided pressure-sensitive adhesive strip which is conductive in the z-direction, i.e., substantially perpendicularly to the eventual bond face. In accordance with the invention, the z-direction conductivity is brought about by at least one conductive component, as for example by at least two conductive components, such as more particularly by exactly two conductive components, which connect in the z-direction the two opposing strip surfaces intended for bonding. A connection of the surfaces intended for bonding in the z-direction through conductive components is present in the invention even in those embodiments of the pressure-sensitive adhesive strip in which the conductive components are disposed in the region between the surfaces intended for bonding, in a direction which as well as a z-direction component also has an x- and/or y-direction component. In the region between the surfaces intended for bonding, the conductive components are preferably disposed substantially perpendicularly to the eventual bonding face.

Customarily, moreover, the conductive components are bent and adhered to the surfaces of the pressure-sensitive adhesive strip that are intended for bonding, thereby enabling more simple contacting of the contacts/power leads of the components to be bonded. These portions of the conductive components, bonded to the surfaces, therefore form contact faces lying in the x, y-plane.

In the invention the customarily at least two conductive components used are preferably identical or of the same kind, though they may also be different. The conductive components are composed preferably of copper. Further preferred embodiments of the double-sided pressure-sensitive adhesive strip are described in the claims. The supplying of a component with electricity, the transport of data between them, and the grounding as well take place in this case via at least one component having one or more conductive cores.

Through the electrification of double-sided adhesive tapes which establish contact between consumer product and power source, it is possible for the step operations identified above to be unified, very largely automated, and significantly accelerated, hence allowing the processes to be more efficient. The invention enables the supplying of various mounted components with voltage directly via the adhesive strip, corresponding to an integration of functions. The cost and complexity of assembly in production, such as in automobile construction, for example, are reduced. Mounting of the consumer product no longer requires soldering, plugging or clipping: instead, simple adhesive mounting is sufficient. The invention allows numerous operating steps to be outsourced. The mounted assemblies are supplied to the OEM and supplied with power directly through the bonding operation. Not only power conduction but also data transport can take place through multifunctional adhesive tapes of the invention, and other electronics (sensors) can be integrated into the pressure-sensitive adhesive strips, for antitheft protection, for example.

The invention in particular enables a cost saving. This arises on the one hand from a reduced assembly time, since in particular there is no need for bolted connections or other joining technology. Nor are any additional plug connectors needed, and so component prices drop. Moreover, it has hitherto been necessary to connect plug connectors to cables manually, whereas the present invention allows for complete automation. Automakers could also outsource the cabling, as the cabling is integrated in the adhesive strip itself, which in some cases is used for assembly anyway.

The technology on which the invention is based can also be transferred from the automobile industry, with a wide field of exterior and interior application, to other markets, such as to the electronics segment, for example. As a result of the growing proportion of "smart" devices, moreover, the electrification of adhesives is forward-looking. The invention affords the possibility of supplying electricity to components for which such supply was to date possible only at very great cost and complexity. In view of the increasing number of electric components as well, the prospect is that of a steadily growing market.

As a result of bonding over the full area using a pressure-sensitive adhesive strip of the invention, moreover, it is possible to avoid corrosion of leads. The leads are entirely surrounded by pressure-sensitive adhesive strips, more particularly foamlike strips, of the invention, and no water can enter the bodywork, subject to the proviso that the component is bonded over the full area. In the case of plugged-in components such as indicators, for example, on the other hand, sealing is not automatically provided. The water is able to get behind the component and hence into the interior of the bodywork where there are sometimes cables directly.

In accordance with the invention, preferably, flat cables, with or without insulation, are applied to the adhesive strip, which establishes the contact between consumer product and power source. It is also possible to contemplate the use of metal foils such as copper foils, for example, which typically are uninsulated.

In one preferred embodiment, in the case of the double-sided pressure-sensitive adhesive strip, the conductive components are wrapped around the edges of the strip. Typically in this case the two conductive components are disposed on opposite edges of the strip, i.e., on opposite sides of the strip, and more particularly on the opposite shorter sides of the strip. This embodiment is particularly simple to implement. FIG. 1 shows the cross section of a double-sided pressure-sensitive adhesive strip (1) of this kind having two conductive components (2, 3), such as flat cables, for example, which are wrapped around the edges of the strip (1), and specifically on opposite sides of the strip (1).

Figure 2:
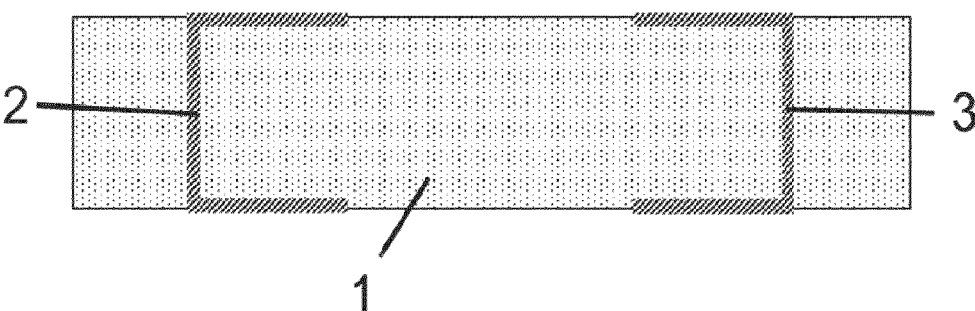
FIG. 2 shows the cross section of a double-sided pressure-sensitive adhesive strip (1) of the invention having two conductive components (2, 3), such as flat cables, for example, which are passed in the z-direction through the strip (1). The protruding regions of the conductive components (2, 3) are bent and adhered to the corresponding surfaces of the adhesive strip (1).

In a further preferred embodiment of the double-sided pressure-sensitive adhesive strip, the conductive components are passed in the z-direction through the strip, thus allowing the barrier effect to be utilized. After the conductive components have been passed through the adhesive strip, the protruding regions of the conductive components can, for example, be bent and adhered to the corresponding surfaces of the adhesive strip. In the installed state, the lead is not open and is therefore not exposed directly to the effects of weathering. Here again, the flow of power is ensured by way of the tape. FIG. 2 shows the cross section of a double-sided pressure-sensitive adhesive strip (1) of this kind having two conductive components (2, 3), such as flat cables, for example, which are passed in the z-direction through the strip (1). The regions of the conductive components (2, 3) projecting from the strip (1), moreover, are bent and adhered to the corresponding surfaces of the adhesive strip (1) that are intended for subsequent bonding to components. Contacting is accomplished via corresponding contact points provided on the component and, for example, on the bodywork part of the motor vehicle.

In another preferred embodiment of the pressure-sensitive adhesive strip, the conductive components such as uninsulated copper cables, and more particularly the regions thereof that are bonding to the adhesive strip surfaces intended for subsequent bonding with components, are shaped to form a sinusoidal conductor track. The sinusoidal conductor track allows the adhesive strip to be stretched in the x-direction and therefore for radii and/or curved placement to be realized. A curved placement or bonding of flexible conductor tracks is made possible. Suggestions of particularly preferred embodiments are offered in this context by, for example, WO 2018/229609 A1.

Figure 3:
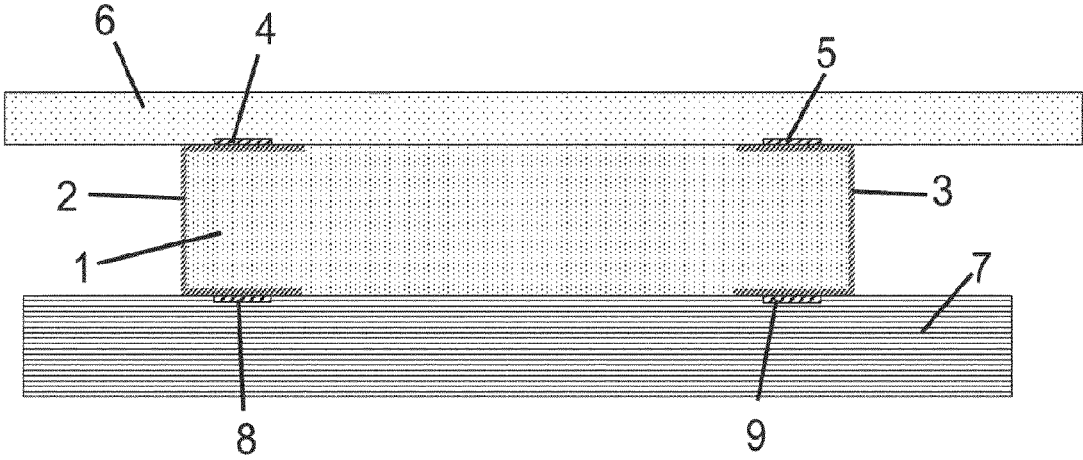

FIG. 3 shows, furthermore, the cross section of an assembly composed of:

- (i) a pressure-sensitive adhesive strip (1) of the invention having two conductive components (2,3) wrapped around the edges of the strip, as described in FIG. 1, this strip being bonded between
- (ii) a component (6) having contacts and/or power leads (4,5) which are in contact with the two conductive components (2,3) of the strip (1), i.e., a component bearing a bond, and
- (iii) a consumer product (7) having contacts and/or power leads (8,9) which are in contact with the two conductive components (2, 3) of the strip (1), i.e., a component for bonding.

The contacts and power leads therein typically each represent a positive and negative pole. Furthermore, there may also be leads utilized for data transport or for grounding. A power lead such as a flat cable, for example, may also consist, moreover, of a plurality of individual cores.

The present invention accordingly further relates to a component having power leads and/or contacts, which bears a bonded pressure-sensitive adhesive strip of the invention, the power leads and/or contacts of the component being in contact with the conductive components of the strip. The invention also relates, accordingly, to an assembly composed of a first component having contacts and/or power leads and a consumer product having contacts and/or power leads as a further component, the two components being bonded by means of a pressure-sensitive adhesive strip of the invention, the contacts and/or power leads of the first component and of the further component being in each case in contact with the conductive components of the strip.

The pressure-sensitive adhesive strip comprises one or more layers of pressure-sensitive adhesive, i.e., layers of adhesive consisting of a pressure-sensitive adhesive, and optionally comprises one or more, preferably viscoelastic, intermediate carrier layers, i.e., carrier layers which are disposed between other layers.

In one particularly preferred embodiment, the pressure-sensitive adhesive strip is carrier-free and consists typically of a single layer of pressure-sensitive adhesive. The thickness of the PSA layer is customarily 20 to 5000 μm, preferably 50 to 2500 μm. In a variant typical, for example, of barrier adhesives, the thickness of the PSA layer is more particularly 25 to 300 μm, such as 50 to 150 μm, for example. In another variant, more particularly typical of foamed PSAs, the thickness of the PSA layer is preferably 100 to 2000 μm, more preferably 400 to 1500 μm, more particularly 400 to 1200 μm, such as 500 to 1000 μm, for example.

In an alternative preferred embodiment, the pressure-sensitive adhesive strip is constructed of a preferably viscoelastic intermediate carrier layer and respective PSA layers disposed on the two opposing surfaces of the intermediate carrier layer. The two PSA layers may be identical or different in terms of their thickness and/or chemical composition. The intermediate carrier layer customarily has a thickness of between 5 and 125 μm, preferably between 10 and 60 μm, more preferably between 10 and 50 μm, and more preferably still between 10 and 40 μm. In an alternative embodiment, typical more particularly of foamed intermediate carrier layers, the thickness of the intermediate carrier layer is preferably 100 to 3000 μm, more preferably 400 to 1500 μm, more particularly 500 to 1200 μm, such as 600 to 1000 μm, for example. Independently of one another the PSA layers customarily have a thickness of between 20 and 1000 μm, more preferably between 40 and 200 μm and more particularly from 50 to 150 μm.

In accordance therewith, pressure-sensitive adhesive strips of the invention typically have a thickness of 20 to 5000 μm. In one preferred variant, typical more particularly of unfoamed adhesive strips, the thickness of the strip is preferably 25 to 500 μm, more preferably 50 to 400 μm and more particularly 100 to 300 μm. In another preferred variant, typical more particularly of adhesive strips having at least one foamed layer, the thickness of the strip is preferably 100 to 3000 μm, more preferably 400 to 2000 μm, more particularly 500 to 1500 μm, such as 600 to 1200 μm, for example.

A pressure-sensitive adhesive (PSA) is understood in the invention, and customarily in the general usage, as a material which at least at room temperature is permanently tacky and also adhesive. A characteristic of a PSA is that it can be applied by pressure to a substrate and remains adhering there, with no further definition of the pressure to be applied or the period of exposure to this pressure. In general, though in principle dependent on the precise nature of the PSA and also on the substrate, the temperature and the atmospheric humidity, the influence of a minimal pressure of short duration, which does not go beyond gentle contact for a brief moment, is enough to achieve the adhesion effect, while in other cases a longer-term period of exposure to a higher pressure may also be necessary.

PSAs have particular, characteristic viscoelastic properties which result in the permanent tack and adhesiveness. The feature of these adhesives is that when they are mechanically deformed, there are processes of viscous flow and there is also development of elastic forces of recovery. The two processes have a certain relationship to one another in terms of their respective proportion, in dependence not only on the precise composition, the structure and the degree of crosslinking of the PSA, but also on the rate and duration of the deformation, and on the temperature.

The proportional viscous flow is necessary for the achievement of adhesion. Only the viscous components, frequently brought about by macromolecules with relatively high mobility, permit effective wetting and effective flow onto the substrate where bonding is to take place. A high viscous flow component results in high tack (also referred to as surface stickiness) and hence often also in high adhesion. Highly crosslinked systems, crystalline polymers, or polymers with glasslike solidification lack flowable components and are in general devoid of tack or possess only little tack at least.

The proportional elastic forces of recovery are necessary for the achievement of cohesion. Furthermore, the forces of recovery ensure permanently good contact, since the conductor tracks introduced are pressed against the contacts. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G") are employed, and can be determined by means of dynamic mechanical analysis (DMA). G' is a measure of the elastic component, G" a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle δ.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)\cdot\sin(\delta)$ ($\tau$=shear stress, $\gamma$=deformation, $\delta$=phase angle=phase shift between shear stress vector and deformation vector).

A composition is considered in particular to be a PSA, and is defined in particular as such for the purposes of the invention, when at 23° C., in the deformation frequency range from 100 to 101 rad/sec, both G' and G" are situated at least partly in the range from 103 to 107 Pa. "Partly" means that at least a section of the G' curve lies within the window subtended by the deformation frequency range from 100 inclusive up to 101 inclusive rad/sec (abscissa) and by the G' value range from 103 inclusive to 107 inclusive Pa (ordinate), and when at least a section of the G" curve is likewise situated within the corresponding window.

The pressure-sensitive adhesive strip of the invention can comprise, for example, at least one pressure-sensitive adhesive layer, which is based on poly(meth)acrylate, silicone (co)polymer, nitrile rubber, i.e., acrylonitrile-butadiene rubber, or synthetic rubber, wherein the synthetic rubber can be chemically and/or physically crosslinked.

In one preferred embodiment the pressure-sensitive adhesive strip comprises at least one PSA layer based on poly(meth)acrylate. Poly(meth)acrylates are advantageous in particular because they are oxidation-resistant, transparent and colorless and are not subject to any yellowing in sunlight. Regarding PSAs based on poly(meth)acrylate and their production, the skilled person is in possession of extensive information, from, for example, Donatas Satas: "Handbook of Pressure Sensitive Adhesive Technology", 3rd edition, 1999, chapter 19. In accordance with the invention a "poly(meth)acrylate" refers typically to a polymer which is obtainable by radical polymerization of acrylic and/or methacrylic monomers and also, optionally, further monomers which are copolymerizable. More particularly a "poly(meth)acrylate" refers to a polymer whose monomer basis consists to an extent of at least 50 wt % of acrylic acid, methacrylic acid, acrylic esters and/or methacrylic esters, with acrylic esters and/or methacrylic esters being included at least proportionally, preferably to an extent of at least 30 wt %, based on the overall monomer basis of the polymer in question.

In another preferred embodiment, the pressure-sensitive adhesive strip comprises at least one PSA layer based on synthetic rubber, the rubber in question preferably comprising vinyl aromatic block copolymer. Since there are diverse synthetic rubbers, broad profiles of properties can be produced according to the type of rubber used. PSA layers based on vinyl aromatic block copolymer may in particular have high peel adhesion even on surfaces with low surface energy, and the maximum peel adhesion is achieved relatively quickly. They also exhibit a large drop in peel adhesion during extensive stretching, and can therefore be used in stretchable systems. Moreover, on account of their frequently low water vapor permeation, they are frequently employed as barrier adhesives. Regarding PSAs based on synthetic rubber such as more particularly vinyl aromatic block copolymer and production thereof, the skilled person is in possession of extensive information, from, for example, Donatas Satas: "Handbook of Pressure Sensitive Adhesive Technology", 3rd edition, 1999, chapters 14-16.

The at least one PSA layer based on synthetic rubber, such as more particularly vinyl aromatic block copolymer, in one particularly preferred embodiment has a water vapor transmission rate (WVTR) of less than 100 g/(m2*d), more preferably of less than 50 g/(m2*d), more preferably still of less than 40 g/(m2*d), more particularly of less than 30 g/(m2*d), such as, for example, of less than 20 g/(m2*d). Using a barrier adhesive of this kind allows the penetration of moisture to be prevented or at least minimized; that is, weathering effects in particular can be minimized. A good barrier adhesive typically exhibits low permeability to oxygen and especially to water vapor, has sufficient adhesion to the substrate and is able to flow well onto this substrate. A low flow capacity onto the substrate can be reduced by incomplete wetting of the substrate surface and the barrier effect of the interface can be reduced by remaining pores, since the ingress of oxygen and water vapor from the side is enabled independently of the properties of the adhesive. Only if the contact between composition and substrate is continuous are the properties of the composition the determining factor for the barrier effect of the adhesive composition. Suitable PSA layers based on vinyl aromatic block copolymer with barrier effect, and their production, are described for example in DE 10 2008 047964 A1, DE 10 2009 036968 A1, DE 10 2009 036970 A1, DE 10 2011 085034 A1, DE 10 2012 202377 A1 and DE 10 2015 212 058 A1.

In a further embodiment, the pressure-sensitive adhesive strip may comprise at least one PSA layer based on a blend of poly(meth)acrylate and synthetic rubber such as more particularly vinyl aromatic block copolymer. Blends of these kinds are intended in particular to combine the advantageous properties of the individual polymer components. Such PSA layers are disclosed for example in DE 10 2013 215296 A1 and DE 10 2013 215297 A1.

PSAs of the invention may comprise at least one tackifier resin in order to increase the adhesion in a desired manner. A "tackifier resin" is understood in accordance with the general understanding of the skilled person to be a low molecular mass, oligomeric or polymeric resin that raises the adhesion (the tack, the intrinsic stickiness) of the PSA by comparison with the otherwise identical PSA nevertheless containing no tackifier resin. The skilled person knows of preferred quantities and types of tackifier resin, dependent on factors including the nature of the polymer basis; see, for example, in Donatas Satas: "Handbook of Pressure Sensitive Adhesive Technology", 3rd edition, 1999. Useful information in this regard is also disclosed for example in DE 10 2017 206 083 A1.

Pressure-sensitive adhesives of the invention may comprise further additives, such as more particularly:

foaming agents, as for example microballoons, typically with a fraction of 0.2 to 10 wt %, preferably of 0.25 to 5 wt %, based in each case on the total weight of the PSA, primary antioxidants, as for example sterically hindered phenols, preferably with a fraction of 0.2 to 1 wt % based on the total weight of the PSA, secondary antioxidants, as for example phosphites, thio-
esters or thioethers, preferably with a fraction of 0.2 to
1 wt % based on the total weight of the PSA,
process stabilizers such as, for example, C radical scav-
engers, preferably with a fraction of 0.25 to 1 wt %
based on the total weight of the PSA,
light stabilizers such as, for example, UV absorbers or
sterically hindered amines, preferably with a fraction of
0.2 to 1 wt % based on the total weight of the PSA,
processing assistants, preferably with a fraction of 0.2 to
1 wt % based on the total weight of the PSA,
endblock reinforcer resins, preferably with a fraction of
0.2 to 10 wt % based on the total weight of the PSA,
plasticizing agents, as for example plasticizer oils, or
liquid polymers of low molecular mass, such as low
molecular mass polybutenes, for example, and/or
optionally further polymers preferably elastomeric in
nature.

Elastomers utilizable accordingly include, among others,
those based on pure hydrocarbons, as for example unsatu-
rated polydienes such as natural or synthetically generated
polyisoprene or polybutadiene, chemically substantially
saturated elastomers such as, for example, saturated ethyl-
ene-propylene copolymers, α-olefin copolymers, poly-
isobutylene, butyl rubber, ethylene-propylene rubber, and
also chemically functionalized hydrocarbons such as, for
example, halogen-containing, acrylate-containing, allyl or
vinyl ether-containing polyolefins, preferably with a fraction
of 0.2 to 10 wt % based on the total weight of the PSA.

The nature and amount of the blending components may
be selected as required. If migratable additives are employed
in the PSAs, then preferably additives of the same kind are
likewise used in the carrier layer, if present.

According to a further preferred embodiment of the
pressure-sensitive adhesive strip, at least one PSA layer is
foamed, preferably with microballoons. Foamed PSA sys-
tems have been known for some considerable time, with
corresponding description in the prior art. Polymer foams
may be produced in principle in two ways. One way is by the
effect of a blowing gas, whether added as such or resulting
from a chemical reaction, and a second way is via incorpo-
ration of hollow spheres into the material matrix. Foams
produced in the latter way are referred to as syntactic foams.
Compositions foamed using hollow microspheres are
notable for a defined cell structure with a homogeneous size
distribution of the foam cells. With hollow microspheres,
closed-cell foams without cavities are obtained, the features
of which include better sealing action against dust and liquid
media when compared to open-cell variants.

Furthermore, chemically or physically foamed materials
have a greater propensity to irreversible collapse under
pressure and temperature, and frequently exhibit lower
cohesive strength. Particularly advantageous properties can
be achieved when the microspheres used for foaming are
expandable microspheres (also referred to as "microbal-
loons"). By virtue of their flexible, thermoplastic polymer
shell, foams of this kind have a higher capacity to conform
than those filled with nonexpandable, nonpolymeric hollow
microspheres (for example, hollow glass spheres). They
have better suitability for compensating manufacturing tol-
erances, of the kind generally affecting injection-molded
parts, for example, and they are also better able to compen-
sate thermal stresses, because of their foam character. More-
over, it is possible to exert further influence over the
mechanical properties of the foam via the selection of the
thermoplastic resin in the polymer shell. For example, even
when the foam has a lower density than the matrix, it is possible to produce foams having higher cohesive strength
than with the polymer matrix alone. For instance, typical
foam properties such as the capacity to conform to rough
substrates can be combined with a high cohesive strength for
self-adhesive foams. Briefly summarized, the effect of the
foaming, more particularly by means of microballoons, is
that of a high capacity to conform to rough substrates, hence
enabling, for example, uniform and crease-free bonding to
uneven surfaces. It may also at least partly compensate for
the raised nature of the conductive components. Foamed
adhesives, furthermore, often have a greater shock resis-
tance. Microballoon foams are typically superior to other
foams, moreover, in having a higher cohesive strength.

Suitable PSA layers based on synthetic rubber such as,
more particularly, vinyl aromatic block copolymer and
foamed using microballoons, and their production, are dis-
closed for example in DE 10 2008 004 388 A1, DE 10 2008
056980 A1, DE 10 2015 206 076 A1 and DE 10 2017 218
519 A1. Suitable microballoon-foamed PSA layers based on
poly(meth)acrylate and their production are disclosed for
example in DE 10 2008 004 388 A1, DE 10 2008 052625
A1, DE 10 2008 059050 A1 and DE 10 2016 209707 A1.
Suitable microballoon-foamed PSA layers based on a blend
of poly(meth)acrylate and synthetic rubber such as more
particularly vinyl aromatic block copolymer, and their pro-
duction, are disclosed for example in DE 10 2013 215296
A1 and DE 10 2013 215297 A1. As the stated specifications
show, the foamed PSA layer may typically in each case be
varied over a wide thickness range, for which crosslinking
may also make a contribution.

In pressure-sensitive adhesive strips of the invention
having at least one preferably viscoelastic intermediate
carrier layer, alternatively or additionally to the PSA layer,
the intermediate carrier layer as well may be foamed, again
preferably with microballoons. The foaming of an interme-
diate carrier layer produces advantages comparable with
those for the foaming of a PSA layer. In one preferred
embodiment the foamed intermediate carrier layer is based
on poly(meth)acrylate. For example, DE 10 2008 052625
A1, DE 10 2008 059050 A1 and DE 10 2012 212883 A1
describe an acrylate-based viscoelastic foam carrier and its
production. PSA layers disposed thereon may have a differ-
ent polymer basis: for example, they may be based likewise
on poly(meth)acrylate or else on synthetic rubber such as
vinyl aromatic block copolymer. As the stated specifications
show, the foamed intermediate carrier layer can typically be
varied over a broad thickness range, for which crosslinking
may also make a contribution.

In pressure-sensitive adhesive strips of the invention with
intermediate carrier layer it is in principle possible to make
use in particular of various stretchable or non-stretchable
film carriers, as are disclosed for example in EP 3333236
A1.

In accordance with the invention, an intermediate carrier
layer in the form of a carrier film such as a polymer film, for
example, may also be used, having a water vapor transmis-
sion rate (WVTR) of less than 0.1 g/(m2*d) and an oxygen
transmission rate (OTR) of less than 0.1 cm3/(m2*d*bar), as
described for example in DE 10 2009 036970 A1 and DE 10
2015 212 058 A1.

As described above, the conductive pressure-sensitive
adhesive strip of the invention may be used for bonding (a)
a first component having contacts and/or power leads to (b)
a consumer product having contacts and/or power leads, as
a further component, the contacts and/or power leads of the
first component and of the further component being in each case in contact with the conductive components (data or power) of the pressure-sensitive adhesive strip.

Possible applications of the pressure-sensitive adhesive strip of the invention are to be seen, for example, in the interior and exterior—that is, the inside space and outside space—of an automobile. For example, indicators, illuminated trim strips and spoilers with integrated brake light can be secured and supplied with power in one step. The invention can also be used for insignia lighting. Integration may take place in particular in GPS and radio aerials as well. Also conceivable is the attachment of model-dependent equipment items, such as parking sensors or daylight running lights, by means of electrified pressure-sensitive adhesive strips in accordance with the present invention. From the production standpoint this has the advantage that equipment-specific components of this kind can simply be attached by bondings. Specifically, in relation to this example, this means that all of the special equipment can be attached to a "standard bumper". The manufacturer need no longer fabricate different variants of the bumper, but instead only has to provide a contacting facility at appropriate points. This leads to significant cost reduction, since the trend more and more is toward individualizing cars in terms of equipment and adapting them to the requirements and desires of the respective customer. In the vehicle interior as well there are diverse possibilities for use, since the increasingly important user experience usually also goes hand in hand with an increasing proportion of electronic components. Instances of this include, in particular, ambient lighting or else on-board electronics (adhesive bonding of displays and touch panels).

In the field of battery technologies as well there are diverse areas of application that can be opened up. The technology can also be transposed to other areas, as for example to general electronics and to areas which have hitherto not yet proven to be typical sectors for application of adhesive tapes or pressure-sensitive adhesive strips. Lighting technology may be mentioned here, illustratively. For example, pressure-sensitive adhesive strips with barrier effect represent a reliable solution for encapsulation in display and lighting applications. The pressure-sensitive adhesive strip of the invention is also suitable as a bonding solution with good electrical conductivity for the shielding and grounding of electronic devices.

Particularly in relation to smart materials, the introduction of sensors may also be useful. On the one hand, the failure of an adhesive bond can be recognized at an early stage, since the power circuit is interrupted first before the adhesive bond fails completely. This may serve as an indicator for recognizing a failing adhesive bond before it fails (imminent failure of a bond is also possible with pressure sensors). On the other hand, it is also conceivable to use sensors for security technology. Sensor-equipped tapes may be introduced directly into the window frame, for the bonding of glazing units, and utilized for detecting vibration and/or pressure. In relation to smart living, it is also possible to develop door and window seals with corresponding sensors embedded into their adhesive film.

It may be stated, moreover, that the electrification or the integration of function in double-sided adhesive applications offers great potential in the e-mobility sector in particular. Existing methods can be replaced, and entirely new fields of application opened up, since according to the current state of knowledge there is no comparable product on the market.

Briefly summarized, the applications of the inventions, subdivided according to the respective fields of application, are therefore in particular as follows:

a) in the automobile exterior:
  indicators, spoilers with integrated brake light, trim strips with integrated light, daylight running lights, GPS and radio aerials, insignia lighting
  safety electronics: the parking sensors are attached by bonding as a strip (there are no individual recesses for each sensor in the bumper; in other words, a special item of bumper equipment, independent of model, is simply mounted by bonding)
b) in the automobile interior:
  interior lighting (ambient lighting)
  on-board electronics (touch panels)
c) general electronics applications:
  display bonding, touch panels (e.g., household appliances), lighting technology, sensors in the case, for example, of window bonds (anti-burglary protection)
d) construction segment and home improvement:
  bonding of windows into profiles
  dimming glass or smart glass
  integration of sensors for anti-burglary protection (pressure or vibration sensors)
  lighting technology
e) other:
  sensors in adhesive strips in order to indicate failure of an adhesive bond at an early stage (if the power flow is interrupted, this indicates a defect, or by pressure sensors)

EXAMPLES

The invention is elucidated in more detail below by a number of illustrative pressure-sensitive adhesive strips having conductive components. On the basis of the examples described below, particularly advantageous embodiments of the invention are elucidated in more detail, without any intention therewith of unnecessary limitation of the invention.

Double-sided pressure-sensitive adhesive strips having at least one, such as two for example, conductive components, in accordance with the present invention may be based, for example, on the following pressure-sensitive adhesive strips:

1. a pressure-sensitive adhesive strip consisting of a PSA layer based on synthetic rubber with barrier effect, as described for example in example 1 of DE 10 2015 212 058 A1. A good barrier effect in the present invention means that weathering effects, especially moisture, do not lead to corrosion of the contacts. In the case of components which are subject, for example, to continual weathering, this is extremely relevant for a long life. Examples include exterior parts of automobiles.
2. a pressure-sensitive adhesive strip consisting of a microballoon-foamed PSA layer based on vinyl aromatic block copolymer, as described for example in example B1 from DE 10 2017 218 519 A1.
3. a pressure-sensitive adhesive strip consisting of a microballoon-foamed PSA layer based on poly(meth) acrylate, as described for example in example 10 of DE 10 2008 004 388 A1.
4. a pressure-sensitive adhesive strip consisting of a viscoelastic acrylate foam carrier and two PSA layers disposed thereon and based on vinyl aromatic block copolymer, as described for example in the examples of DE 10 2012 212 883 A1.
5. a pressure-sensitive adhesive strip consisting of a viscoelastic acrylate foam carrier and two PSA layers disposed thereon and based on poly(meth)acrylate, as described for example in example MT5 of DE 10 2008 052625 A1.

In the double-sided pressure-sensitive adhesive strip of the invention, the conductive components may for example be wrapped around the edges of the strip or passed in the z-direction through the strip. The conductive components may be, for example, Leoni exFC insulated flat cables (flat leads). In this case, soft-annealed electrolyte copper is employed. Possible insulation comprises PVC, polyurethane-based thermoplastic elastomer, polyester-based thermoplastic elastomer, PP and ETFE. The width may be 1-7 mm, the thickness 0.1-0.5 mm.

Test Methods

All the measurements were conducted unless otherwise indicated at 23° C. and 50% relative humidity.

The data were ascertained as follows:

OTR, WVTR

The oxygen transmission rate (OTR) and water vapor transmission rate (WVTR) of a layer are determined according to DIN 53380 Part 3 or ASTM F-1249. For this purpose the layer is applied to a permeable membrane. The oxygen transmission rate is measured at 23° C. and a relative atmospheric humidity of 50% using a Mocon OX-Tran 2/21 instrument. The water vapor transmission rate is determined at 37.5° C. and a relative humidity of 90%.

Thickness

The thickness of a layer of adhesive may be determined by determining the thickness of a portion, defined in terms of its length and its width, of a layer of adhesive of this kind applied to a carrier or liner, minus the thickness (which is known or can be ascertained separately) of a portion, with the same dimensions, of the carrier or liner used. The thickness of the layer of adhesive may be ascertained by way of commercial thickness testers (gauge testing instruments) with accuracies of less than 1 μm deviation. Where fluctuations in thickness are found, the mean of measurements at not less than three representative sites is reported—hence, in particular, without measurement at wrinkles, creases, nips and the like.

As already for the thickness of a layer of adhesive, the thickness of a pressure-sensitive adhesive strip or of a carrier layer may also be ascertained by way of commercial thickness testers (gauge testing instruments) with accuracies of less than 1 μm deviation. Where fluctuations in thickness are found, the mean of measurements at not less than three representative sites is reported—hence, in particular, without measurement at wrinkles, creases, nips and the like.

The invention claimed is:

1. A double-sided pressure-sensitive adhesive product comprising:
   a pressure-sensitive adhesive strip comprising two opposing strip surfaces configured for bonding; and
   a first conductive component connecting and physically contacting the two opposing strip surfaces in the z-direction while leaving a portion of both of the two opposing strip surfaces available for bonding to components, wherein the pressure-sensitive adhesive strip further comprises a first exterior lateral edge, and wherein the first conductive component is wrapped around the first exterior lateral edge of the pressure-sensitive adhesive strip.

2. The adhesive product according to claim 1, wherein the adhesive product further comprises a second conductive component, wherein the first conductive component and the second conductive component connect the two opposing strip surfaces configured for bonding.

3. The adhesive product according to claim 2, wherein the first conductive component and the second conductive component are cables that are insulated or uninsulated.

4. The adhesive product according to claim 3, wherein the cables are flat, copper cables, and the pressure-sensitive adhesive strip comprises a thickness within a range of from 100 μm to 3000 μm.

5. The adhesive product according to claim 3, wherein the cables are round, copper cables.

6. The adhesive product according to claim 1, wherein the first conductive component is a metal foil.

7. The adhesive product according to claim 6, wherein the pressure-sensitive adhesive strip further comprises a second exterior lateral edge, and further wherein the adhesive product comprises a second conductive component wrapped around the second exterior lateral edge of the pressure-sensitive adhesive strip.

8. The adhesive product according to claim 1, wherein the pressure-sensitive adhesive strip further comprises at least one layer of pressure-sensitive adhesive derived from a (a) poly(meth)acrylate, (b) synthetic rubber, or (c) blend of a poly(meth)acrylate and a synthetic rubber.

9. The adhesive product according to claim 8, wherein the (b) synthetic rubber is a vinyl aromatic block copolymer and the (c) blend is a blend of poly(meth)acrylate and a vinyl aromatic block copolymer.

10. The adhesive product according to claim 1, wherein the pressure-sensitive adhesive strip further comprises at least one foamed, viscoelastic intermediate carrier layer and/or at least one foamed layer of pressure-sensitive adhesive.

11. The adhesive product according to claim 10, wherein each of the layers is foamed with microballoons.

12. The adhesive product according to claim 1, wherein the pressure-sensitive adhesive strip further comprises at least one layer of pressure-sensitive adhesive derived from a synthetic rubber, the at least one layer of pressure-sensitive adhesive having a water vapor transmission rate (WVTR) of less than 100 g/(m$^2$*d).

13. A component, comprising:
   the adhesive product according to claim 1; and
   power leads in contact with the first conductive component.

14. The component according to claim 13, wherein the component further comprises a second conductive component, wherein the first conductive component and the second conductive component connect the two opposing strip surfaces configured for bonding.

15. The component according to claim 14, wherein the first conductive component and the second conductive component are insulated cables or uninsulated cables.

16. The component according to claim 15, wherein the strip further comprises at least one layer of pressure-sensitive adhesive derived from a (a) poly(meth)acrylate, (b) synthetic rubber, or (c) blend of a poly(meth)acrylate and a synthetic rubber.

17. An assembly, comprising:
   the adhesive product according to claim 1;
   a first component comprising power leads, the first component bonded to one of the two opposing strip surfaces of the pressure-sensitive adhesive strip with the power leads in contact with the first conductive component; and
   a second component comprising power leads, the second component bonded to the other of the two opposing strip surfaces of the pressure-sensitive adhesive strip with the power leads in contact with the first conductive component.

18. The assembly according to claim 17, wherein the assembly further comprises a second conductive component, wherein the first conductive component and the second conductive component connect the two opposing strip surfaces configured for bonding.

\* \* \* \* \*